United States Patent [19]
Balmer et al.

[11] Patent Number: 5,398,233
[45] Date of Patent: Mar. 14, 1995

[54] METHOD OF RESETTING COUPLED MODULES AND SYSTEM USING THE METHOD

[75] Inventors: Keith Balmer, Bedford; Iain C. Robertson, Beds, both of England

[73] Assignee: Texas Instruments Incorporated, Dallas, Tex.

[21] Appl. No.: 83,801

[22] Filed: Jun. 28, 1993

[30] Foreign Application Priority Data

Jul. 3, 1992 [GB] United Kingdom ............... 9214198

[51] Int. Cl.⁶ .............................................. H04J 3/14
[52] U.S. Cl. .................... 370/13; 371/11.1; 371/11.2; 371/12; 371/13; 340/825.06
[58] Field of Search .............. 370/13; 371/11.1, 11.2, 371/12, 13; 340/825.08, 825.06; 375/121

[56] References Cited

U.S. PATENT DOCUMENTS

| | | | |
|---|---|---|---|
| 4,654,656 | 3/1987 | Deaver et al. | 340/825.08 |
| 4,703,481 | 10/1987 | Fremont | 371/12 |
| 5,014,193 | 5/1991 | Garner et al. | 371/11.1 |
| 5,251,227 | 10/1993 | Bruckert et al. | 371/12 |
| 5,271,013 | 12/1993 | Gleeson | 371/12 |
| 5,293,613 | 3/1994 | Hayden et al. | 371/12 |

Primary Examiner—Douglas W. Olms
Assistant Examiner—Russell W. Blum
Attorney, Agent, or Firm—Dana L. Burton; Richard A. Stoltz; James C. Kesterson

[57] ABSTRACT

A method of resetting coupled modules and a system using the method are disclosed. The method comprises applying a reset instruction signal to a selected module, the selected module generating a reset permission request signal, one or more other modules (other than the selected module) receiving the reset permission request signal and taking necessary action to avoid system malfunction after the selected module is reset, the one or more other modules sending a permission granted signal, and resetting the selected module once it is determined that the one or more modules have sent a permission granted signal. Other methods and systems are disclosed.

12 Claims, 3 Drawing Sheets

METHOD OF RESETTING COUPLED MODULES AND SYSTEM USING THE METHOD

The present invention relates to electronic circuits or systems that include a number of subsystems and in particular to enabling one such subsystem to be reset whilst others are not.

Often in the operation of a system, subsystems use information relating to the state of other subsystems to modify their actions. An example of this is when a first subsystem makes a direct request to a second system for the second subsystem to carry out a task on behalf of the first subsystem. Here the second subsystem has the information that at the time of making the request the first subsystem was expecting the task to be carried out by the second subsystem. If the state of the first subsystem were to change unexpectedly the system could malfunction, when, for example, the second system reported to the first that the task was complete. Generally a subsystem will only be able to determine the state of other subsystems at particular moments in time and so the operation of system will be vulnerable to subsystems changing their states in between those times.

An example of how a subsystem may change its state unexpectedly is when it is reset. Conventionally on receipt of a reset signal a subsystem is immediately put into a predetermined state and it may be some time before other subsystems can determine the current state of the subsystem that was reset. In that time a malfunction of the system could occur. For this reason it is conventional for the entire system to be reset together or for such part of it that includes subsystems to be reset, the state of which subsystems does not need to be known by the other subsystems of the system. That approach may cause the data obtained from the work completed by the reset subsystems to be lost.

It is an object of the present invention to enable a subsystem to be reset whilst maintaining the information held by other subsystems that relates to the state of the subsystem being reset.

In some circumstances it would be desirable that a subsystem could not only determine whether or not another subsystem is reset but also that it could make that determination some time before the other subsystem is, in fact, reset, and when that resetting is to take place. For example a link subsystem communicating with a second subsystem may need a little time to terminate that communication before resetting. If the second subsystem were to reset and the first subsystem could only determine that the second subsystem had reset, at the earliest, at the moment that it reset then for a certain period of time after the resetting the first subsystem would still be trying to communicate. An example of this would be the time to complete a handshaking protocol for the communication.

It is therefore a further object of the present invention to enable a subsystem to determine that another subsystem is to be reset a short period of time before the reset actually takes place.

According to one aspect of the present invention there is provided a method of resetting a first module of a system including a plurality of modules coupled together by a communication network, the exchange of signals between the modules over the network being governed by a protocol, the method including applying to the first module a reset instruction signal, the first module responding to the reset instruction signal to cause a reset permission request signal to be applied to at least one of the modules of the plurality other than the first module, the or each of the modules receiving the reset permission request signal responding to the reset permission request signal to send a permission granted signal after it has taken any action necessary to complete or modify the protocol sufficiently to ensure that the system does not malfunction after the first module has been reset, determining when the or each module that received the reset permission request signal has sent a permission granted signal, and resetting the first module once that determination has been made.

According to a second system having a plurality of modules coupled together by a communication network, the exchange of signals between the modules over the network being governed by a protocol, the system including first application means which apply to a first module a reset instruction signal, second application means responsive to the receipt of the reset instruction signal by the first module to apply to at least another module a reset permission request signal, the or each other module receiving the reset permission request signal including means responsive to the reset permission request signal to take any action necessary to complete or modify the protocol sufficiently to ensure that the system does not malfunction after the first module has been reset and to produce a permission granted after that action has been taken, logic means for determining when the module that received the reset permission request signal has produced a permission granted signal, and means responsive to the logic means to reset the first module when that determination is made.

The present invention will now be described, by way of example only, with reference to the accompanying drawings of which:

The Figures are diagrams of systems or parts of systems divided into subsystems or modules. In the diagrams some of the signals transmitted and received by the modules are also shown.

Figure 1:
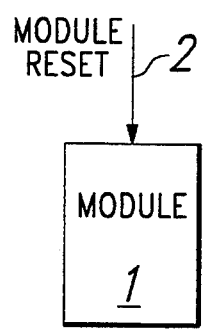
FIG. 1 is a diagram of a module of a system receiving a module reset signal from a source external to the module.

FIG. 1 shows a single module 1 receiving a module reset signal 2 from some external source.

Figure 2:
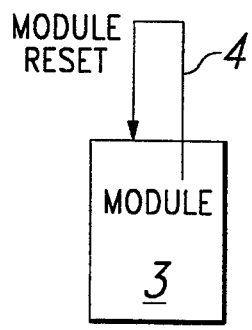
FIG. 2 is a diagram of a module that is generating its own module reset signal.

FIG. 2 shows a single module 3 generating its own module reset signal 4.

Module reset signals cause modules to carry out a procedure that puts the module into a predetermined state. Conventionally this happens immediately and no steps are taken to ensure that other modules are informed of the reset the moment that it happens, which results in the problems discussed above.

In an example of the present invention a module receiving a module reset signal is not immediately put into the predetermined state, but instead sends requests for permission to reset to the other modules and waits until those other modules send back their signals granting the permission. On receipt of the permission the module is then reset to the predetermined state.

Figure 3:
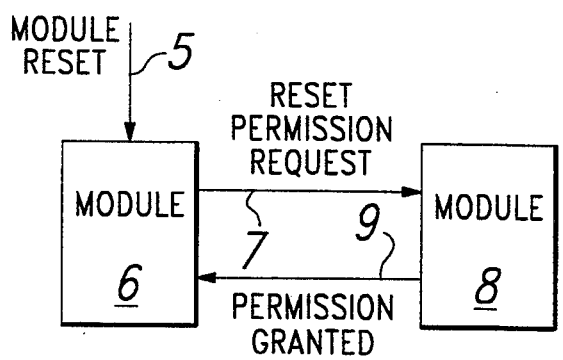
FIG. 3 is a diagram showing a two module system or part of a system.

FIG. 3 shows a simple example of a system having only two modules. On receipt of a module reset signal 5 the first module 6 sends a request for permission to reset signal 7 to the second module 8. On receipt of that signal 7 the second module 8 sends back to the first module 6 a permission granted signal 9, either immediately or after a period of time during which the module 8 takes any action needed to ensure that when the module 6 resets the system will not malfunction.

On receipt of the permission granted signal 9 the first module 6 resets to a predetermined state. Note that in this example, as well as in all the examples described below, a module reset signal received by a module could be generated either externally, perhaps by another module as in FIG. 1, or by the module itself in response to a particular condition as in FIG. 2.

Figure 4:
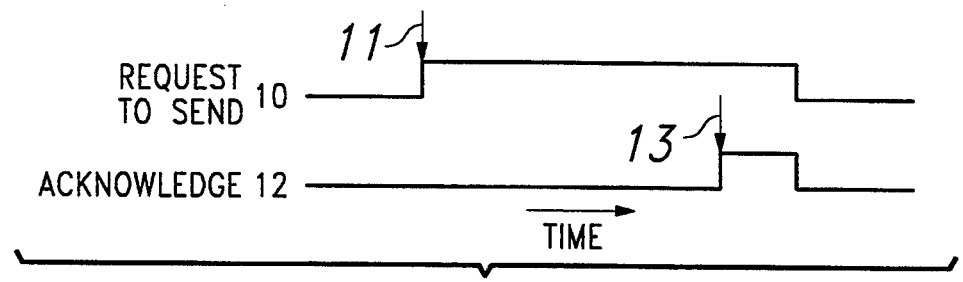
FIGS. 4 to 6 are diagrams illustrating the adverse effects of a reset on a handshaking communication and how these are overcome by the present invention.
Figure 5:
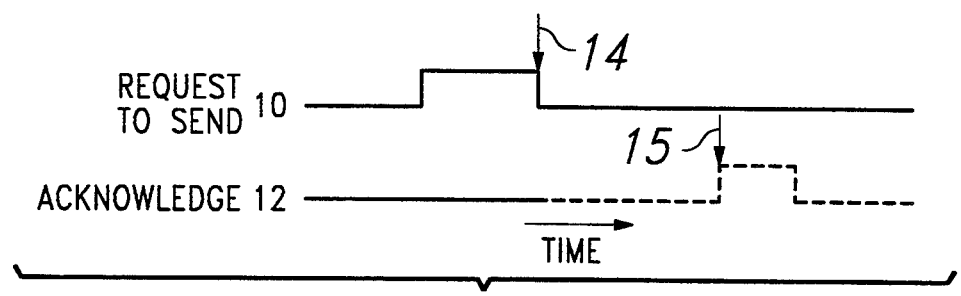
Figure 6:
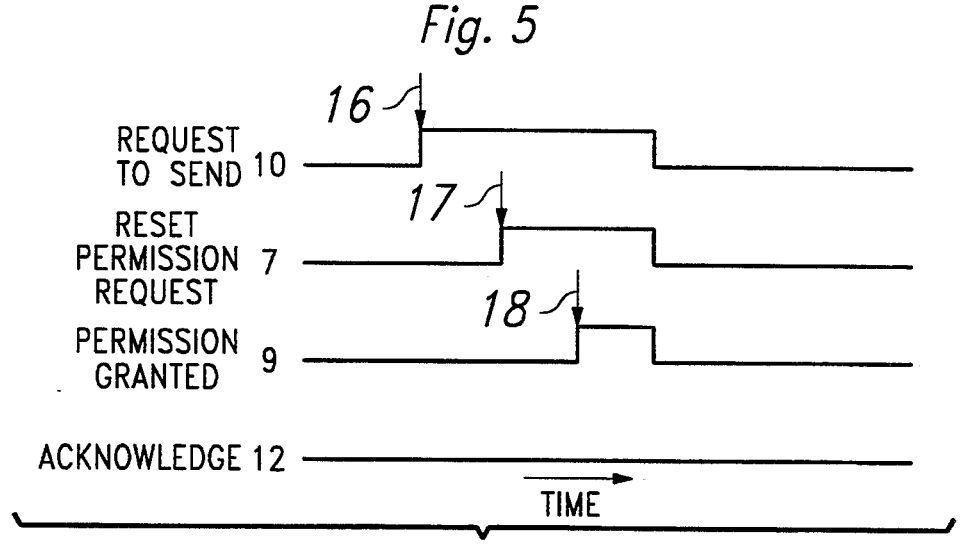

FIGS. 4, 5 and 6 illustrate the adverse effects of a reset on a communication situation using handshaking and how these can be overcome by use of the present invention. The Figures show the waveforms of certain signals between two modules and will now be described in detail.

FIG. 4 shows a conventional handshake protocol for a communication system. When a first module, such as the module 6 shown in FIG. 3, has some data to send to a second module, such as the module 8 shown in FIG. 3, it transmits a request to send signal 10 to the second module by feeding a HIGH signal 11 over a line provided for the purpose. Some time later the second module 8 sends back an acknowledgement signal 12 by feeding a HIGH signal 13 over another line. Shortly afterwards both lines are released to LOW and the data is transferred.

FIG. 5 illustrates the problem that occurs if the first module 6 is reset before the acknowledgement signal 12 is returned. On being reset the first module 6 terminates the request to send signal 10 so that the HIGH level on the line is released at a time 14. That condition is not one that is expected by the second module 8 as part of the handshake protocol so that the further behaviour of the module 8 becomes unpredictable and/or erroneous. It may well simply issue an unexpected acknowledgement signal at a time 15 to the now reset first module 6.

FIG. 6 illustrates how two modules operating using the present invention overcome the problem just described with reference to FIG. 5. Assume that after issuing a request to send signal 10 at a time 16 the first module 6 receives a module reset signal 5. The first module 6 then issues a reset permission request signal 7 at a time 17 to the second module 8 which then acts to prevent an acknowledgement signal being issued and instead sends a permission granted signal 9 at a time 18 to the first module 6.

On receipt of the permission granted signal 9 the first module 6 is released to respond to the reset signal and changes to its predetermined state.

In general a module may need to send reset permission request signals to several other modules with which it communicates and should receive permission granted signals from all of them before being reset.

A more complex situation arises when a second module like that just described has both received a reset permission request signal from a first module and has issued a reset permission request signal to a third module. The next event could be either the second module issuing a permission granted signal to the first module or the second module receiving a permission granted signal from the third module.

In the first case the first module would reset and the second module would await a permission granted signal from the third module before resetting.

In the second case the second module would reset. This brings the second module into a predetermined state and so it would be unaware that the first module had issued a request unless the first module were to maintain its reset request signal until it received an answer, either sending the request continuously or reissuing the request from time to time. The second module should also be responsive to a maintained reset request signal after it has reset.

An alternative to the first module maintaining the request signal is for the second module to maintain a record after it has reset that it had received before resetting a reset permission request from the first module, so that the second module can respond to the request after it has reset. This can be achieved by the second module maintaining a flag, that is not reset when the rest of the module is, the flag being set when the second module has received a reset permission request but has not responded with a permission granted signal.

Either of these alternatives could be applied where a system has two modules both of which can issue reset permission requests to each other.

Systems may also have modules which need to receive reset permission requests from more than one module or need to send them to more than one other module. Such systems are illustrated in FIGS. 7 and 8.

Figure 7:
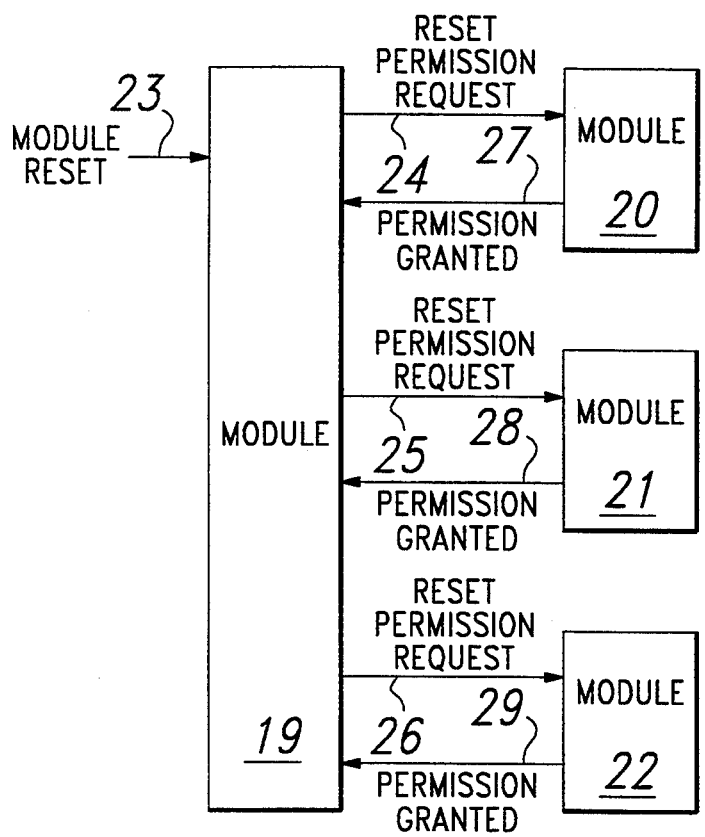
FIGS. 7 and 8 are diagrams showing systems having modules which send reset permission requests to more than one module and modules which receive reset permission requests from more than one module.
Figure 8:
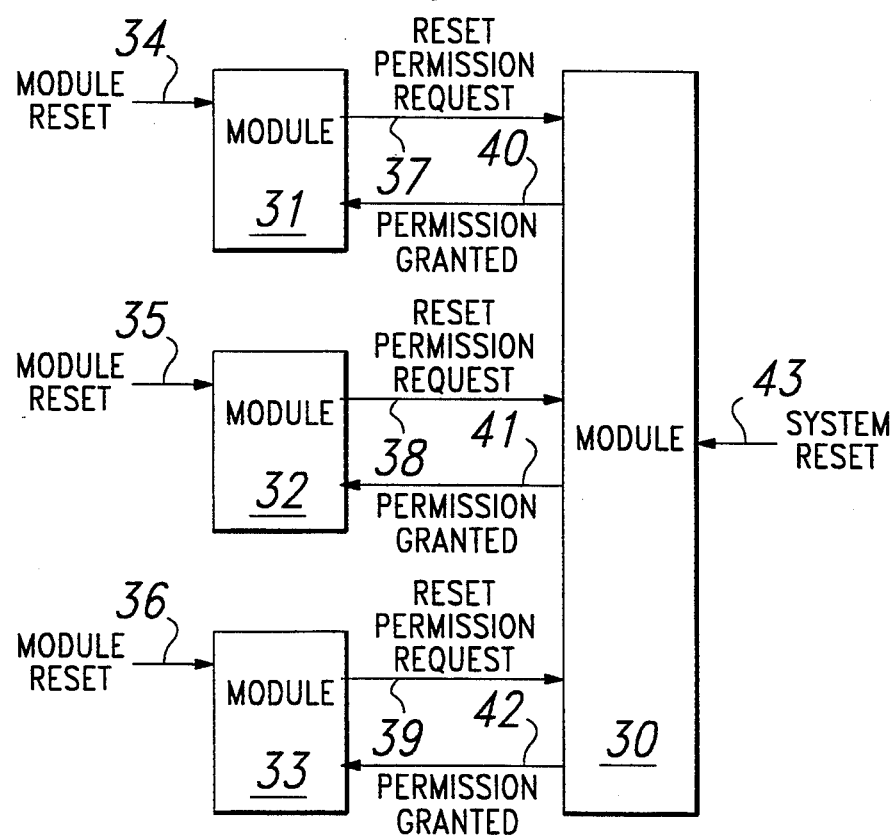

FIG. 7 shows a first module 19 which requires, when it receives a module reset signal 23, the permission of three other modules 20, 21, 22 before it can reset. To obtain that permission the first module issues to each of the modules a reset permission request 24, 25, 26. When each of the three modules 20, 21, 22 is ready to allow the first module to reset it returns a permission granted signal 27, 28, 29 to the first module. The first module only resets after it has received permission from all of the three other modules.

It would be possible, of course, to connect the four modules so that a single reset permission request issued by the first module is applied to each of the three other modules.

It would also be possible to combine the permission granted signals using some logic means to give a single signal indicating that all three had granted permission and to apply that single signal to the first module which would then reset in response to it.

FIG. 8 shows a first module 30 and three other modules 31, 32, 33 which require the permission of the first module 30 before they can reset. On receiving a module reset signal 34, 35 or 36 one of the three modules 31, 32, or 32 issues a reset permission request signal 37, 38 or 39 and waits for a permission granted signal 40, 41 or 42 to be returned. Preferably the first module 30 is constructed to be able to identify the module from which the request for permission signal originated and would issue the permission granted signal to that module. However, it would be possible for the first module 30 to operate without being able to identify the source of a request for permission to reset signal, for example by having a common input for such requests and to issue a general permission signal. However some means may have to be provided for resolving any difficulties caused by more than one of the three modules making a request for permission to reset at the same time and each of the three modules should be prevented from resetting in response to a permission granted signal if it had not issued a request for permission. On the other hand, if the modules are so constructed that they always respond to a permission granted signal by resetting then all four modules can be reset at the same time in a simple way. On receiving a system reset signal 43 the first module issues a permission granted signal to each of the other modules, so causing them to reset, and also resets itself.

It will be clear that the technique described above can be applied to any electronic system or circuit that can be divided into subsystems and that more complicated arrangements of subsystems requiring permission from others of the subsystems can be catered for by building up the system from the types of arrangements described.

In some systems it may be required to be able to reset some modules without resetting others, though all of the modules are part of the same system. As an example, FIG. 8 could be a computer having three processing units 31, 32, 33 working in parallel and a transfer processor 30 which coordinates the transfer of data between the other three processors. If the transfer processor is trying to transfer data to one of the parallel processors 31, 32, 33, it needs to know if that processor wants to reset, since a reset would disrupt the transfer of the data, possibly causing an error. The use of reset permission request and permission granted signals as described above allows that difficulty to be avoided. The processor 31 might be a master processor in charge of assigning tasks to the other processors 32, 33. When an error condition has occurred or a task is finished then the master processor may require one or both of the other parallel processors to reset, which it effects by providing a module reset signal 35 or 36 to that processor.

For carrying the reset permission request signals and permission granted signals dedicated conductors could be provided in addition to, for example, data, address and control buses. Where a module receives a permission granted signal from more than one module or transmits permission granted signals to more than one module, individual conductors or a common conductor could be employed as mentioned above with reference to FIGS. 7 and 8.

However, dedicated conductors may not be necessary; for example the signals could be transmitted using otherwise unused codes on the data, address or control bus between the modules.

We claim:

1. A method of resetting a selected module of a system said system comprising a plurality of modules coupled together by a communication network, the exchange of signals between said plurality of modules over said communication network being governed by a protocol, said method comprising:
    applying to said selected module a reset instruction signal;
    said selected module responding to said reset instruction signal causing a reset permission request signal to be applied to one or more of said plurality of modules other than said selected module;
    said one or more of said plurality of modules responding to said reset permission request signal by sending a permission granted signal after said one or more of said plurality of modules has taken necessary action such that said system does not malfunction after said selected module is reset;
    determining that said one or more of said plurality of modules has sent a permission granted signal; and
    resetting said selected module after said determination is made.

2. A method according to claim 1 wherein said reset instruction signal is generated within said selected module.

3. A method according to claim 1 wherein said reset instruction signal is generated externally to said selected module.

4. A method according to claim 1 wherein if said one or more of said plurality of modules receiving a reset permission request signal is reset said one or more of said plurality of modules records an indication that it has received said request despite being reset.

5. A method according to claim 4 wherein said one or more of said plurality of modules responds to said indication as if said indication were a reset permission request signal.

6. A method according to claim 1 wherein said reset permission request signal is applied continuously or repeatedly until such time as said permission granted signal is received.

7. A system having a plurality of modules coupled together by a communication network, the exchange of signals between said plurality of modules over said network being governed by a protocol, said system further comprising:
    first application means for applying to a selected module a reset instruction signal;
    second application means for applying to one or more of said plurality of modules a reset permission request signal in response to receipt of said reset instruction signal;
    said one or more of said plurality of modules receiving said reset permission request signal comprising means for taking necessary action, in response to the reset permission request signal, such that said system does not malfunction after said selected module has been reset, and means for producing a permission granted signal after said action has been taken;
    logic means for determining that said one or more of said plurality of modules that received the reset permission request signal has produces a permission granted signal; and
    means for resetting said selected module in response to said logic means.

8. A system according to claim 7 wherein said first application means is part of said selected module and is responsive to a condition of said selected module.

9. A system according to claim 7 wherein said first application means is external to said selected module.

10. A system according to claim 7 wherein said one or more of said plurality of modules receiving a reset permission request signal comprises means for storing an indication that said one or more of said plurality of modules has received a reset permission request signal but has not yet produced a permission granted signal.

11. A system according to claim 10 further comprising means for responding to said indication so that said one or more of said plurality of modules will respond to said reset permission request signal even if said one or more of said plurality of modules has been reset.

12. A system according to claim 7 wherein said second application means applies said reset permission request signal continuously or repeatedly to said one or more of said plurality of modules, and said one or more of said plurality of modules responds to said reset permission request signal even if said one or more of said plurality of modules has been reset.

* * * * *